(12) United States Patent
Kurokawa et al.

(10) Patent No.: US 6,557,663 B2
(45) Date of Patent: May 6, 2003

(54) ELECTRIC POWER STEERING APPARATUS

(75) Inventors: Takanori Kurokawa, Yamatokooriyama (JP); Hirokazu Arai, Yamatokooriyama (JP); Shinichi Tahara, Hikone (JP); Syouji Sawai, Hikone (JP)

(73) Assignees: Koyo Seiko Co., Ltd., Osaka (JP); Shin-Kobe Electric Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/915,274

(22) Filed: Jul. 27, 2001

(65) Prior Publication Data
US 2002/0011377 A1 Jan. 31, 2002

(30) Foreign Application Priority Data

Jul. 27, 2000 (JP) .......................................... 2000-227890

(51) Int. Cl.⁷ .............................. B62D 5/04; B21D 53/28
(52) U.S. Cl. ................ 180/443; 29/893.37; 74/DIG. 10
(58) Field of Search .................... 180/443; 74/DIG. 10; 264/DIG. 26, DIG. 29; 29/893, 893.3, 893.37

(56) References Cited

U.S. PATENT DOCUMENTS 5,059,464 A    10/1991  Mikuni
5,074,828 A    12/1991  Ellis
6,291,373 B1 *  9/2001  Sakaguchi et al. .......... 442/156

FOREIGN PATENT DOCUMENTS

| JP | 60206628 | 10/1985 |
| JP | A874969 | 3/1996 |
| JP | 09024855 | 1/1997 |
| JP | 11291274 | 10/1999 |
| JP | 11336878 | 12/1999 |
| JP | A2000247245 | 9/2000 |
| JP | 2001121618 | 5/2001 |

* cited by examiner

*Primary Examiner*—Lesley D. Morris
*Assistant Examiner*—Matthew Luby
(74) *Attorney, Agent, or Firm*—Birch, Stewart, Kolasch & Birch, LLP

(57) ABSTRACT

An electric power steering apparatus including a reduction mechanism 5 for transmitting an output of a steering assist motor 1 to a steering mechanism through a worm 3 and a worm wheel 4, in which the worm wheel 4 is formed by a thermosetting synthetic resin filled with a sheet 6 of aramid fibers having a low attacking property to a counter member and an effect of improving the abrasion resistance of the synthetic resin. Even when the reduction mechanism is used in an engine room or the temperature of the reduction mechanism is raised by frictional heat with heightening power, the reduction mechanism is durable, and further the gears have excellent abrasion resistance and toughness and improved durability.

3 Claims, 8 Drawing Sheets

ELECTRIC POWER STEERING APPARATUS

BACKGROUND OF THE INVENTION

The present invention relates to an electric power steering apparatus using a motor as the source of steering assist force.

FIG. 1 is a cross sectional view showing the structures of a conventional electric power steering apparatus.

As shown in FIG. 1, for example, an electric power steering apparatus for automobiles comprises a first steering shaft 101 connected to a steering wheel 100 for steering; a second steering shaft 103 whose upper end portion is connected coaxilally with the lower end portion of the first steering shaft 101 through a torsion bar 102 and whys lower end portion is connected to a steering mechanism joined to wheels; a torque sensor 104 for detecting a torque applied to the first steering shaft 101 by rotation of the steering wheel 100, based on twist of the torsion bar 102; a steering assist motor driven according to the result of detection given by at least the torque sensor 104; and a reduction mechanism which is joined to a n output shaft of the motor and includes a worm 105 and a worm wheel 106 for decelerating rotation of the output shaft and transmitting the resultant rotation to the second steering shaft 103. Such an electric power steering apparatus for automobiles is constructed to reduce the driver's labor for steering by assisting the operation of the steering mechanism according to the rotation of the steering wheel 100 with the rotation of the motor.

The worm 105 constituting the reduction mechanism is positioned to cross the axis of the second steering shaft 103 and supported in a housing 107 through a pair of roller bearings. The second steering shaft 103 to which the worm wheel 106 is attached is supported in the housing 107 through a pair of roller bearings 108.

The worm wheel 106 includes a circular tooth member which is made of a synthetic resin and has teeth meshing with the worm 105, and a metal fitting member to be fitted into the circular tooth member. The worm wheel 106 is made of a synthetic resin, so that noise caused by meshing with the worm 105 is reduced and the workability in making the teeth is improved.

An electric power steering apparatus using a motor as the source of steering assist force as mentioned above is employed mainly by midget cars and relatively small cars with an engine displacement of around 1300 cc, for example. On the other hand, relatively large cars with an engine displacement of around 2000 cc or more, for example, often employ a hydraulic steering apparatus using a hydraulic pump connected to the engine as the source of steering assist force.

By the way, since an engine as a travel driving source is also used as a hydraulic pump driving source of the hydraulic steering apparatus, even if steering assistance is not intended, the hydraulic pump is driven by the engine, and thus hydraulic steering apparatus does not meet a demand for low fuel consumption. Moreover, there is an increasing demand for applying en electric power steering apparatus to cars with an engine displacement of around 1300 cc to 2000 cc. According to this demand, it has been considered to apply the electric power steering apparatus to relatively large and heavy vehicles or tracks in the near future, and thus steering assistance with higher power compared to a conventional steering assist force will be required. Accordingly, in the case where at least a part of the worm and worm wheel constituting the reduction mechanism is formed by a synthetic resin, the high-heat-resistant, high-strength worm and worm wheel are necessary.

BRIEF SUMMARY OF THE INVENTION

An object of the present invention is to provide an electric power steering apparatus capable of solving the above problem.

An electric power steering apparatus according to the first invention is an electric power steering apparatus for assisting steering by transmitting an output of a steering assist motor to a steering mechanism through a driving gear and a driven gear meshing with the driving gear, and characterized in that at least one of the driving gear and driven gear is formed by a thermosetting synthetic resin filled with aramid fibers.

According to the first invention, since one or both of the driving gear and driven gear are formed by a thermosetting synthetic resin with an excellent heat resistance, even when the reduction mechanism is used in an engine room or the temperature of the reduction mechanism is raised by frictional heat with heightening power, the gear is durable. Moreover, the thermosetting synthetic resin is filled with aramid fibers having a low attacking property to a counter member and an effect of improving the abrasion resistance of the synthetic resin, one or both of the driving gear and driven gear filled with the aramid fibers has an excellent abrasion resistance and toughness and further enables a reduction in the abrasion of the gear as the meshing counterpart, thereby improving the durability of both the gears. Furthermore, since the aramid fibers have a small thermal expansion coefficient and good heat stability, the gears can have excellent dimensional stability. In particular, since a para-linked aramid fiber has a negative thermal expansion coefficient, it is convenient to limit the thermal expansion of the thermosetting synthetic resin. However, since the para-linked aramid fiber is extremely tough, it is difficult to form the teeth of the gear by cutting. Therefore, it is preferred to mix the para-linked aramid fibers with meta-linked aramid fibers that have slightly lower toughness but have good workability and to fill the mixed fibers.

An electric power steering apparatus according to the second invention is characterized in that the aramid fibers are formed into a sheet. Here, the sheet is, for example, felt obtained by needling a pile of the aramid fibers to couple the respective fibers, woven material or knitted material made by using threads of the aramid fibers. The needling is a process of putting a needle having a hook into the fiber pile and drawing the needle out of the fiber pile in the direction of the thickness of the fiber pile so that the fibers caught by the hook in this action are oriented in the thickness direction. The fibers oriented in the thickness direction perform the function of coupling the fibers oriented in the plane direction.

According to the second invention, since the positional arrangement of the aramid fibers and the distance between the aramid fibers can be freely set, it is possible to further increase the abrasion resistance and toughness of the gear filled with the sheet.

An electric power steering apparatus according to the third invention is characterized in that the sheet is wound repeatedly into a cylindrical shape and further folded like bellows in an axial direction of the cylindrical shape.

According to the third invention, since the sheet of the aramid fibers are wound repeatedly into the cylindrical shape and folded in the axial direction of the cylindrical shape, the aramid fibers form circular fiber layers and are three-dimensionally positioned. Therefore, even when the teeth are formed by cutting, it is possible to further increase the abrasion resistance and toughness of the tooth portion.

When this structure is applied particularly to the worm wheel by selecting the above-mentioned felt as the sheet, the contact faces of the folds of the sheet are stacked in the axial direction, so that the shear force exerted from the worm is spread and received evenly by the respective contact faces. It is therefore possible to further improve the strength and durability.

On the other hand, when a structure where the sheet is simply wound repeatedly is adopted, the contact faces of the wound sheet are stacked in a radial direction, so that the direction of the shear force exerted from the worm and the direction of the contact faces agree with each other. Therefore, a separation phenomenon tends to occur at the contact faces, and thus it is not preferred to adopt such a structure.

An electric power steering apparatus according to the fourth invention is characterized in that the sheets are stacked in layers.

According to the fourth invention, since sheets of the aramid fibers are layered to form a plurality of fiber layers, it is possible to equalize the density of the aramid fibers, thereby further increasing the abrasion resistance and toughness of the tooth portion even when the teeth are formed by cutting.

An electric power steering apparatus according to the fifth invention is characterized in that the aramid fibers are filled in a ratio of 20 to 60% by volume.

According to the fifth invention, since the aramid fibers filled in a ratio of 20 to 60% by volume reinforce the thermosetting synthetic resin, one or both of the driving gear and driven gear have excellent abrasion resistance and toughness and improved durability.

Further, when the filling amount of the aramid fibers is less than 20% by volume, the brittleness as a characteristic of the thermosetting synthetic resin is increased, and consequently the thermosetting synthetic. resin can not be satisfactorily reinforced. Thus, it is not preferred to fill the aramid fibers in an amount less than 20% by volume. On the other hand, when the filling amount of the aramid fibers exceeds 60% by volume, it is impossible to sufficiently fill the thermosetting synthetic resin into the respective fibers, resulting in insufficient reinforcement of the thermosetting synthetic resin by the aramid fibers. Therefore, it is not preferred to fill the aramid fibers in an amount more than 60% by volume.

The above and further objects and features of the invention will more fully be apparent from the following detailed description with accompanying drawings.

DETAILED DESCRIPTION OF THE INVENTION

Figure 2:
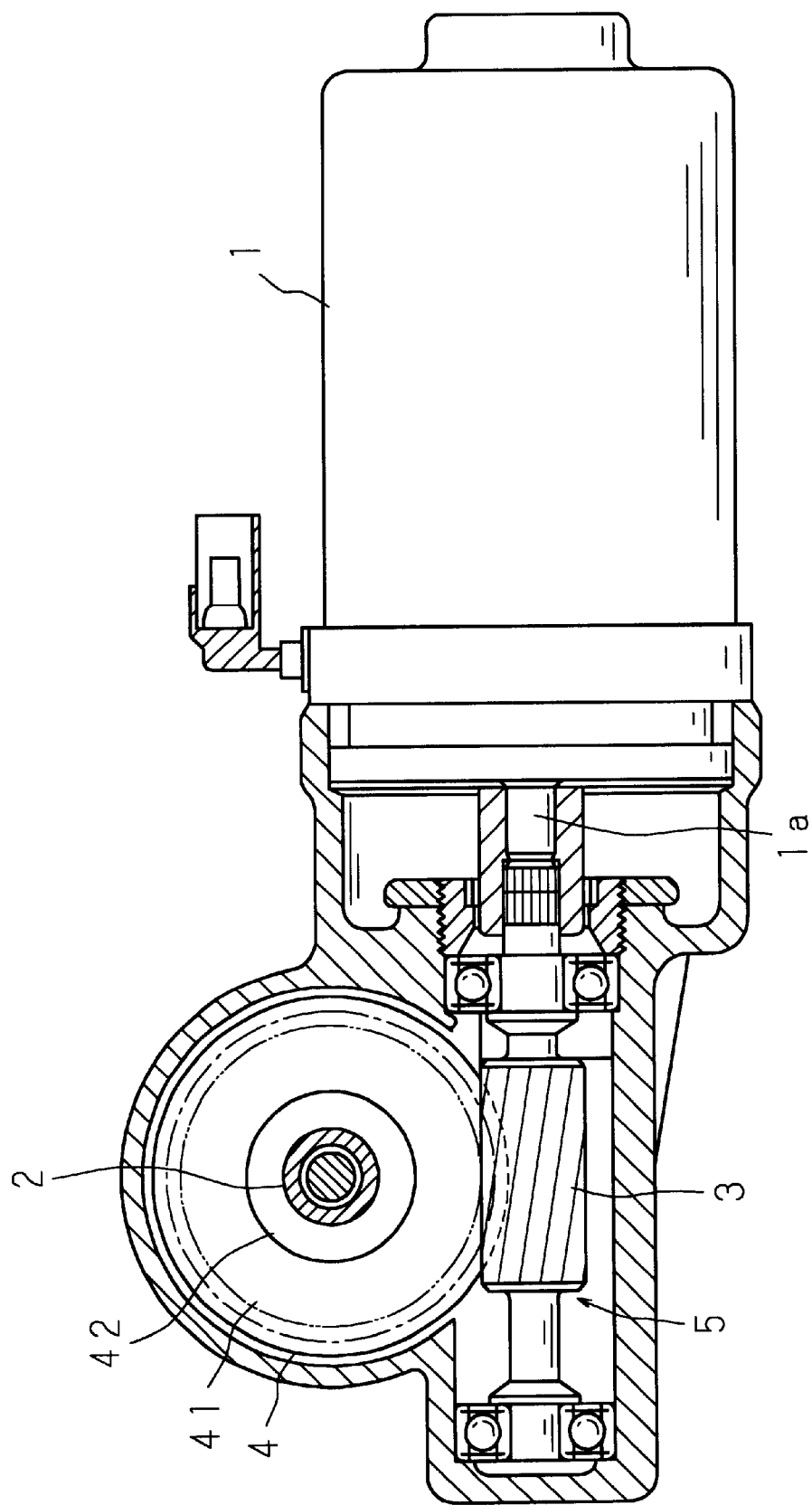
FIG. 2 is a cross sectional view showing the structures of a reduction mechanism and a portion around a motor of an electric power steering apparatus according to the present invention.
Figure 3:
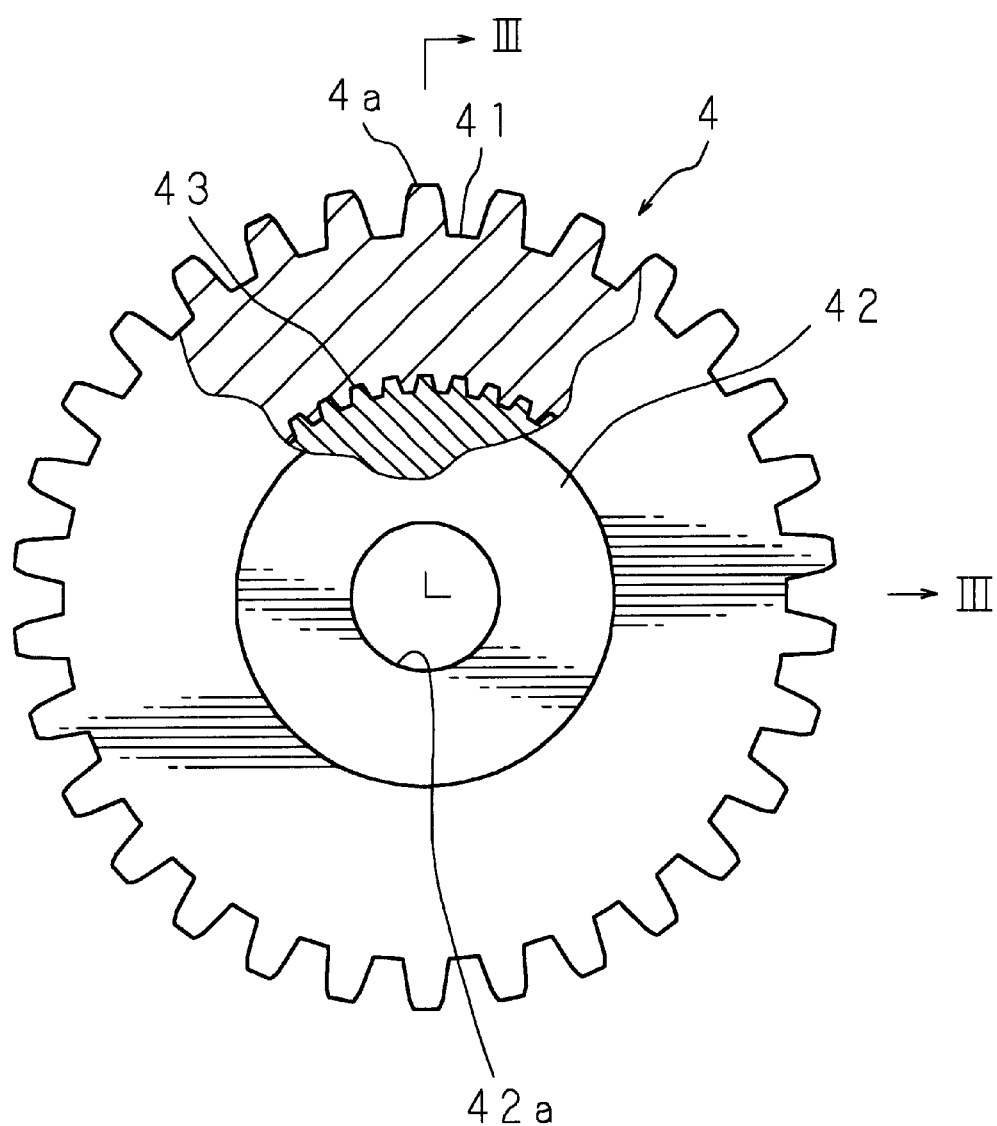
FIG. 3 is an enlarged cross sectional view showing a worm wheel of the electric power steering apparatus according to the present invention.
Figure 4:
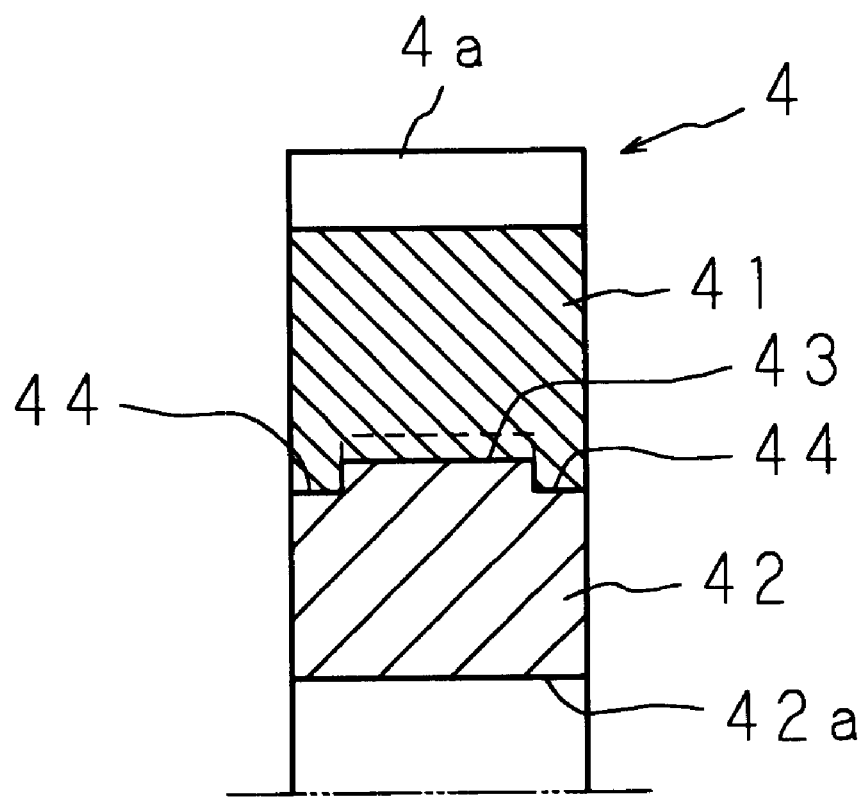
FIG. 4 is a cross sectional view cut along the III—III line of FIG. 3.

The following description will explain the present invention with reference to the drawings illustrating some embodiments thereof.
First Embodiment FIG. 2 is a cross sectional view showing the structures of a reduction mechanism and a portion around a motor of an electric power steering apparatus according to the present invention; FIG. 3 is an enlarged cross sectional view of a worm wheel; and FIG. 4 is a cross sectional view cut along the III—III line of FIG. 3.

Figure 1:
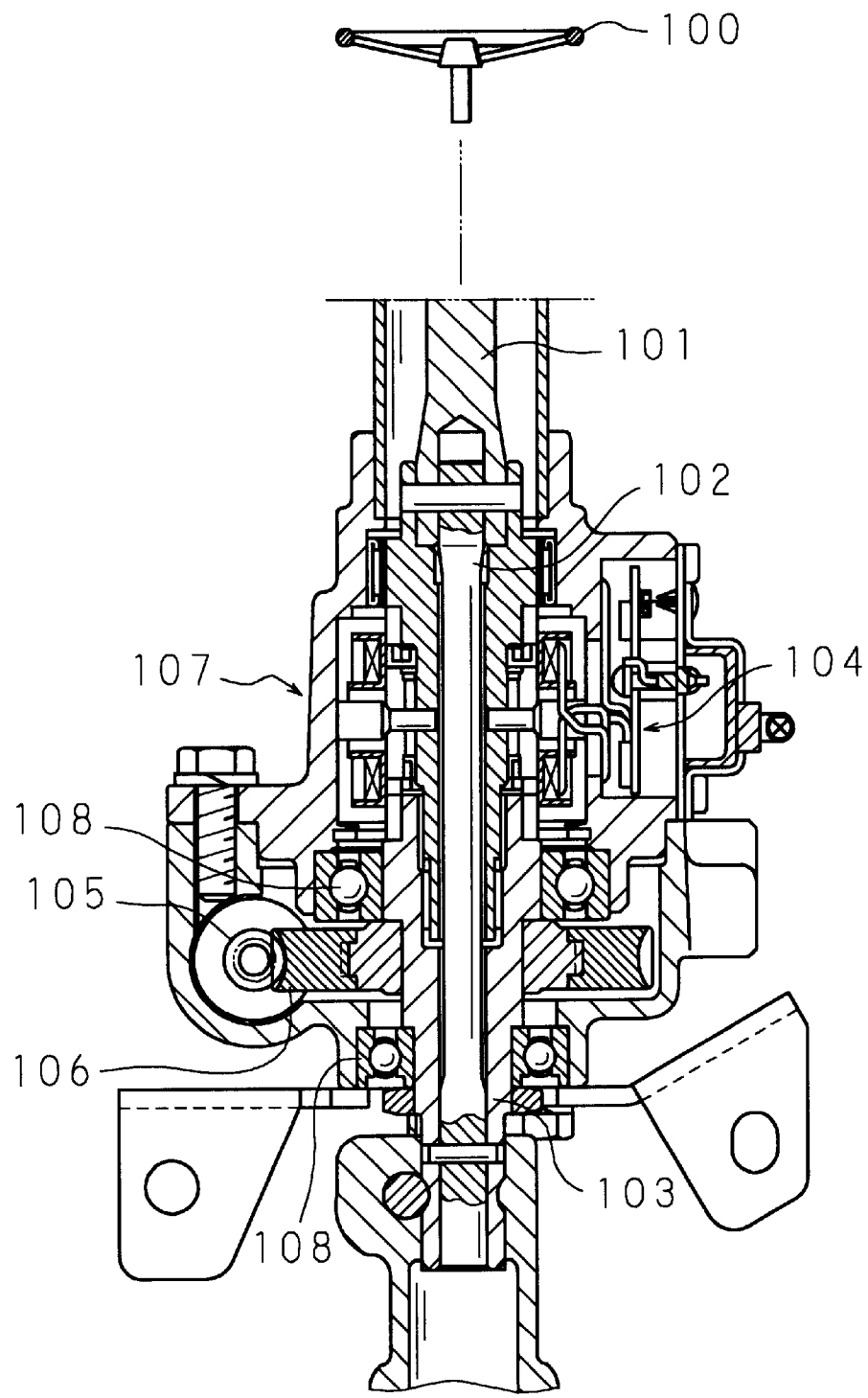
FIG. 1 is a cross sectional view showing the structures of a conventional electric power steering apparatus.

Since the basic structures of the electric power steering apparatus are similar to those of a conventional electric power steering apparatus shown in FIG. 1, the detailed explanation of the similar structures and the explanation of the functions will be omitted.

A reduction mechanism 5 comprises a metal worm 3 which is joined to an output shaft 1a of a steering assist motor 1 and positioned to cross the axis of a second steering shaft 2; and a worm wheel 4 which meshes with the worm 3 and is fitted and fixed on the middle of the second steering shaft 2. The worm wheel 4 of the reduction mechanism 5 includes a circular tooth member 41 which is made of a synthetic resin and has a plurality of teeth 4a to mesh with the worm 3; and a fitting member 42 formed by a metal to be fitted inside the circular tooth member 41. Further, a through hole 42a formed at the center of this fitting member 42 is fitted on the second steering shaft 2.

Figure 5:
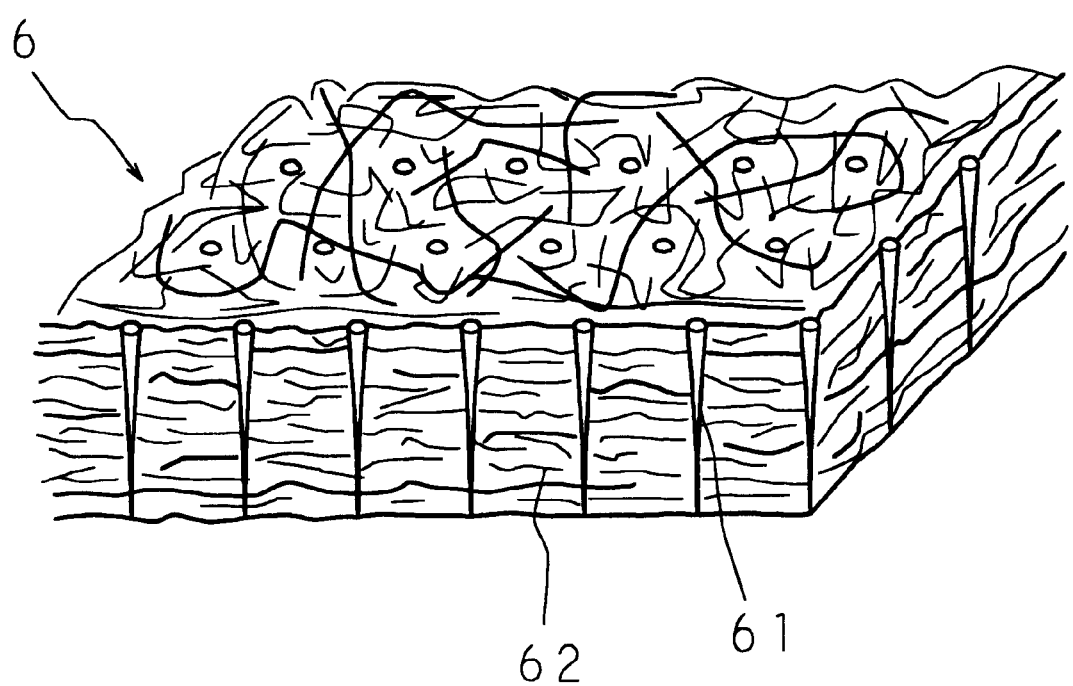
FIG. 5 is a perspective view of a sheet for use in the worm wheel of the electric power steering apparatus according to the present invention.

FIG. 5 is a perspective view showing an example of a sheet of aramid fibers for use in the worm wheel 4. This sheet 6 is in the shape of felt formed by needling a pile of fibers (with a fiber length of around 50 mm) obtained by mixing para-linked aramid fibers with meta-linked aramid fibers, and fibers 61 oriented in the thickness direction of the fiber pile couple fibers 62 oriented in the plane direction by the needling. In this embodiment, "Technora®" available from TEIJIN LIMITED is used as the para-linked aramid fibers and "TEIJINCONEX®" available from TEIJIN LIMITED is used as the meta-linked aramid fibers, and they are each mixed in a ratio of 50% by mass.

Figure 6:
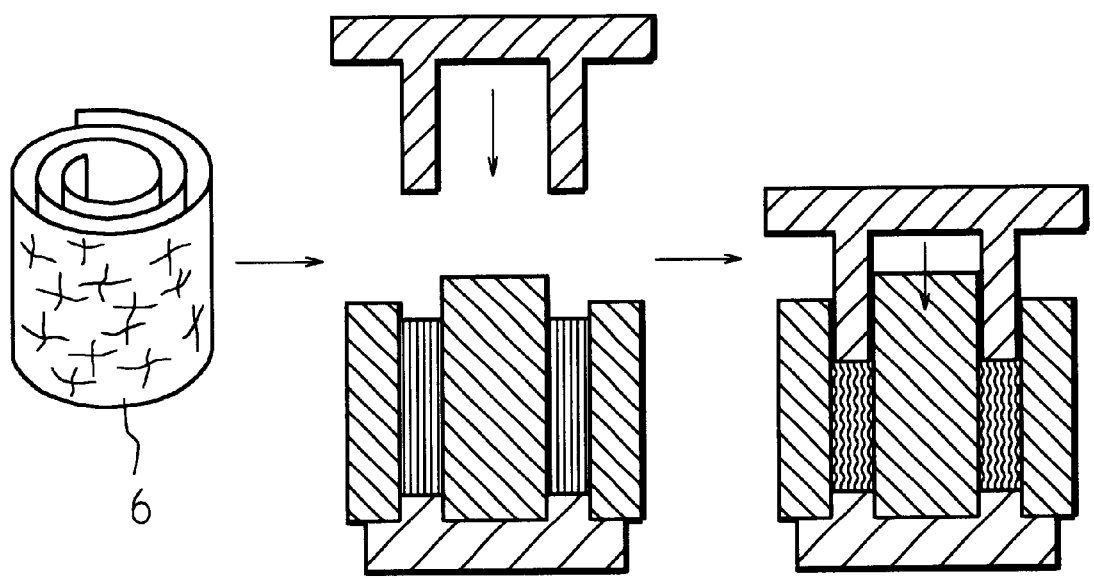
FIG. 6 is an explanatory view illustrating the process of forming the sheet in a ring shape for use in the worm wheel of the electric power steering apparatus according to the present invention.
Figure 7A:
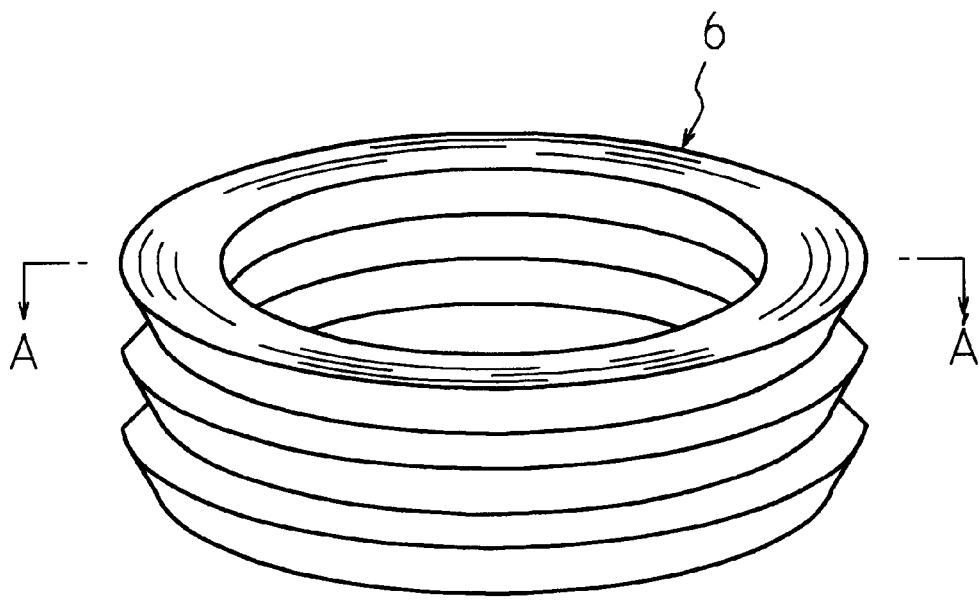
FIG. 7A is a perspective view showing a state in which a sheet of aramid fiber is deformed in a ring shape for use in the worm wheel of the electric power steering apparatus according to the present invention.

FIG. 6 is an explanatory view illustrating the process of deforming the aramid fiber sheet in the shape of felt into a ring shape. FIG. 7A is a perspective view showing a state in which the aramid fiber sheet is deformed in a ring shape by the process shown in FIG. 6, and FIG. 7B is a perspective view of the sheet cut along the A–A' line.

Figure 7B:
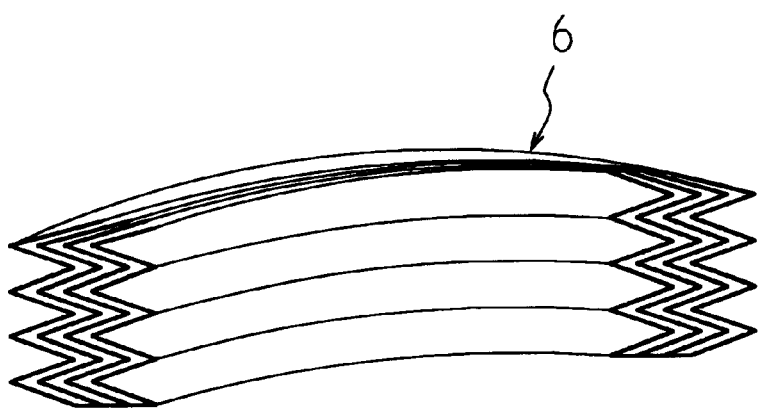
FIG. 7B is a perspective view of the sheet cut along the A–A' line.

As shown in FIG. 6, this sheet 6, i.e., the aramid fiber felt, is wound repeatedly to form a cylindrical shape and pressed in an axial direction of the cylindrical shape within a die for temporary forming so that it is folded like bellows and further formed into a ring shape with the bellows being folded as shown in FIGS. 7A and 7B. The sheet 6 has a size that allows formation of a non-tooth portion and a tooth portion where the teeth 4a are formed.

The sheet 6 thus formed in a ring shape is stored and positioned in a compression-molding die or casting-molding die, and a thermosetting synthetic resin, such as phenol resin, melamine resin, cross-linked polyester amide or epoxy resin, is molded by compression molding or injection molding.

In other words, in compression molding, the circular sheet 6 carrying the thermosetting synthetic resin, such as phenol resin or melamine resin, and the above-mentioned fitting member 42 are stored and positioned in the compression-molding die. Then, by applying heat and pressure, the melted thermosetting synthetic resin sufficiently permeates between the respective aramid fibers, and consequently the circular tooth member 41 having the sheet 6 even in the portion where the teeth are to be processed is formed and the fitting member 42 is coupled to the circular tooth member 41 in one body.

On the other hand, in casting molding, the ring-shaped sheet 6 and fitting member 42 are stored and positioned in the casting-molding die having an air suction gate and a resin filling gate. Then, when the air in the casting-molding die is removed from the air suction gate to make a vacuum (when the pressure is reduced), the melted thermosetting synthetic resin, such as cross-linked polyester amide or epoxy resin, is introduced into the casting-molding die from the resin filling gate due to the negative pressure, the thermosetting synthetic resin liquid sufficiently permeates between the respective aramid fibers, the circular tooth member 41 having the sheet 6 even in the portion where the teeth are to be processed is formed, and the fitting member 42 is coupled to the circular tooth member 41 in one body.

In this compression molding or casting molding, since the thermosetting synthetic resin has higher fluidity in a melted state as compared with a thermoplastic synthetic resin, even when the sheet 6 of the aramid fibers is formed in a ring shape, it is possible to satisfactorily permeate the thermosetting synthetic resin between the respective aramid fibers.

The aramid fibers are filled in a ratio of 20 to 60% by volume. When the filling amount of the aramid fibers is smaller than 20% by volume, the brittleness as a characteristic of the thermosetting synthetic resin is increased, and consequently the thermosetting synthetic resin can not be satisfactorily reinforced. On the other hand, when the filling amount of the aramid fibers exceeds 60% by volume, it is impossible to sufficiently permeate (fill) the thermosetting synthetic resin between the respective fibers during the above-mentioned molding, resulting in insufficient reinforcement of the thermosetting synthetic resin by the aramid fibers.

In the fitting portion between the circular tooth member 41 and the fitting member 42, i.e., the outside of the fitting member 42, raised and recessed lines 43 such as splines are formed at the center in the axial direction of the fitting member 42 and circular recesses 44 are formed at both end portions in the axial direction. Raised and recessed lines and circular protrusions to be fitted into the raised and recessed lines: 43 and circular recesses 44 are formed on the inner side of the circular tooth member 41, so that the circular tooth member 41 and the:fitting member 42 are coupled together in such a manner that relative rotation and relative movement in the axial direction are infeasible. Alternatively, the circular tooth member 41 and the fitting member 42 may be coupled together in such a manner that relative rotation and relative movement in the axial direction are infeasible by providing raised and recessed lines such as knurls on the outer side of the fitting member 42 at the fitting portion between the circular tooth member 41 and fitting member 42.

After molding in the above-mentioned manner, the teeth 4a with a tooth lead twisting in a rotation direction with respect to a rotation axis are formed on the peripheral surface of the circular tooth member 41 by cutting.

Further, in the first embodiment, the sheet 6 of the aramid fibers may be arranged such that the flat sheet is wound into a stick-like shape like a twisted-paper string and this stick is made a circular shape with its both end portions partly overlapped to finally form a ring.

Second Embodiment

Figure 8A:
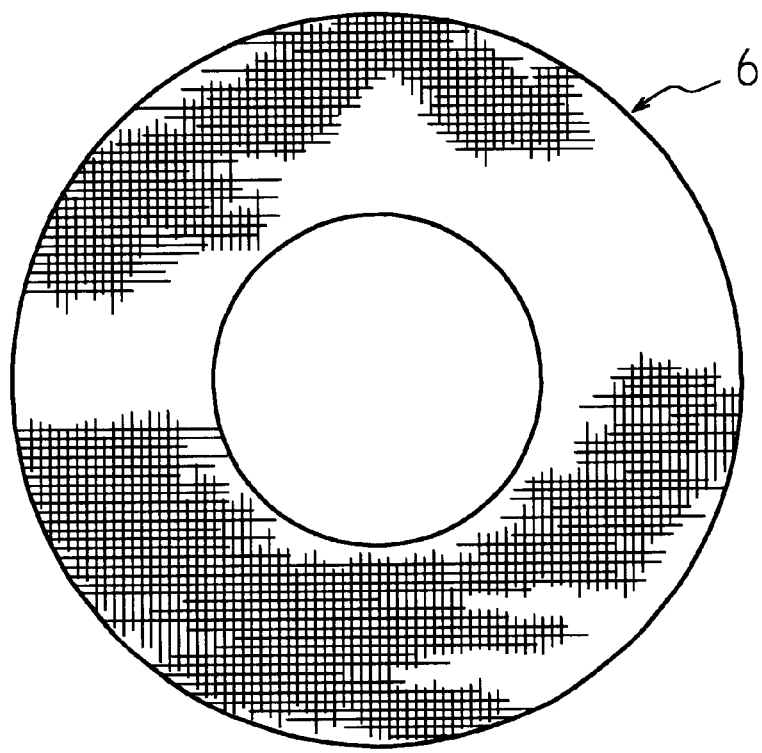
FIG. 8A is an enlarged plan view of a sheet showing the structures of the second embodiment of the electric power steering apparatus according to the present invention.
Figure 8B:
FIG. 8B is a cross sectional view of the same sheet.

FIG. 8A is an enlarged plan view of a sheet of the aramid fibers showing the structures of the second embodiment, and FIG. 8B is a cross sectional view of the same sheet of the aramid fibers.

In this second embodiment, a plurality of sheets 6 of woven aramid fibers are layered, and the layered sheets are compressed in the layering direction by a relatively small force and then punched in a ring shape by a press.

Like the first embodiment, the sheet 6 of this second embodiment is subjected to compression molding or casting molding so that the sheet 6 and thermosetting synthetic resin are made in one body and form the circular tooth member 41.

Since other structures and functions are the same as those of the first embodiment, the detailed explanation of the structures and the explanation of the functions will be omitted.

Third Embodiment

In this third embodiment, instead of forming the sheet 6 of aramid fibers by weaving the aramid fibers, a felt similar to that used in the first embodiment is used and, like the second embodiment, a plurality of this felt sheets are layered, the layered sheets are compressed in the layering direction by a relatively small force and then punched in a circular shape by a press.

Like the first embodiment, the sheet 6 (felt) of the aramid fibers of this third embodiment is subjected to compression molding or casting molding so that the sheet 6 and the thermosetting synthetic resin are made in one body and form the circular tooth member 41.

Since other structures and functions are the same as those of the first embodiment, the detailed explanation of the structures and the explanation of the functions will be omitted.

Fourth Embodiment

In this fourth embodiment, the circular tooth member 41 is formed by injection molding using a granular compound obtained by mixing and kneading a thermosetting synthetic resin and aramid fibers having a fiber length longer than 400 $\mu$m and pulverizing the mixture, instead of knitting or weaving threads of the aramid fibers or accumulating the aramid fibers to make felt.

In the fourth embodiment, the fitting member 42 is stored and positioned as an insert in the injection-molding die, and the granular compound is melted and then injected to the periphery of the fitting member 42. The teeth 4a are formed by molding, without cutting. In the injection molding, a satisfactory molding result is not obtained unless the amount of the aramid fibers is made 30% by volume or less. The reason for this is that if the amount of the aramid fibers exceeds 30% by volume, the aramid fibers twist round a gate and obstruct the injection.

When the fiber length of the aramid fibers is 400 μm or less, the brittleness as a characteristic of the thermosetting synthetic resin is increased, and consequently the thermosetting synthetic resin can not be satisfactorily reinforced. In the fourth embodiment, however, since the aramid fibers have a relatively long fiber length of more than 400 μm, the worm wheel 4 has an excellent abrasion resistance and toughness and further enables a reduction in the abrasion of the worm 3 as the meshing counterpart, thereby improving the durability of the worm 3 and worm wheel 4. Furthermore, when the fiber length of the aramid fibers exceeds 8 mm, the aramid fibers are cut to a length less than 8 mm by an injection screw during injection molding. In other words, in injection molding, since the aramid fibers can not have a length longer than 8 mm, it is not necessary to use aramid fibers with a fiber length longer than 8 mm.

Note that while the sheet 6 is formed by the aramid fibers in the above-explained first embodiment, this sheet 6 may also be formed by fibers made from heat-resistant, high-strength organic macromolecular polymers such as heterocycle-containing aromatic polymer or polyether ether ketone (PEEK). Moreover, it is also possible to mix and use glass fibers, carbon fibers, etc. within a range in which the counter member attacking property is not noticeable.

Besides, in the above-explained first through fourth embodiments, while the circular tooth member 41 of the worm wheel 4 constructed by coupling the fitting member 42 with the circular tooth member 41 is formed by the thermosetting synthetic resin filled with the aramid fibers, it is possible to form the entire worm wheel 4 or the worm 3 by the thermosetting synthetic resin filled with the aramid fibers. Alternatively, for example, it is possible to employ a structure in which the tooth portion has the aramid fibers and the non-tooth portion has glass fibers or carbon fibers.

Moreover, the reduction mechanism 5 in the above-explained first through fourth embodiments may be a hypoid gear including a driving gear as a hypoid pinion and a driven gear as a hypoid wheel, instead of a worm gear including a driving gear 3 as a worm and a driven gear 4 as a worm wheel. Further, the reduction mechanism may be a bevel gear.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus for assisting steering by transmitting an output of a steering assist motor to a steering mechanism through a driving gear and a driven gear meshing with said driving gear, wherein at least one of said driving gear and driven gear is formed by a thermosetting synthetic resin filled with aramid fibers, wherein said aramid fibers are filled in a ratio of 20 to 60% by volume, and wherein said aramid fibers are formed into a sheet.

2. An electric power steering apparatus for assisting steering by transmitting an output of a steering assist motor to a steering mechanism through a driving gear and a driven gear meshing with said driving gear, wherein at least one of said driving gear and driven gear is formed by a thermosetting synthetic resin filled with aramid fibers, wherein said aramid fibers are filled in a ratio of 20 to 60% by volume, wherein said aramid fibers are formed into a sheet; and wherein said sheet is wound repeatedly in a cylindrical shape and further folded like bellows in an axial direction of the cylindrical shape.

3. An electric power steering apparatus for assisting steering by transmitting an output of a steering assist motor to a steering mechanism through a driving gear and a driven gear meshing with said driving gear, wherein at least one of said driving gear and driven gear is formed by a thermosetting synthetic resin filled with aramid fibers, wherein said aramid fibers are filled in a ratio of 20 to 60% by volume, wherein said aramid fibers are formed into a sheet, and wherein said aramid fibers are formed into multiple sheets which are stacked into layers with one another.

* * * * *